United States Patent [19]

Sulewski

[11] Patent Number: 5,599,872
[45] Date of Patent: Feb. 4, 1997

[54] PRESSURE-SENSITIVE ADHESIVE COMPOSITION CONTAINING STYRENE-MALEIC COPOLYMERS

[75] Inventor: John M. Sulewski, Westfield, Mass.

[73] Assignee: Monsanto Company, St. Louis, Mo.

[21] Appl. No.: 645,158

[22] Filed: May 13, 1996

[51] Int. Cl.⁶ .................... C09J 125/08; C09J 133/14; C09J 145/00; C09J 125/14
[52] U.S. Cl. .................... 524/522; 524/517; 525/207; 525/221; 525/223
[58] Field of Search .................... 524/517, 522; 525/207, 221, 223

[56] References Cited

U.S. PATENT DOCUMENTS

| | | | |
|---|---|---|---|
| 2,866,771 | 12/1958 | Sellers | 525/207 |
| 2,935,484 | 5/1960 | Arnold et al. | 525/207 |
| 3,257,478 | 6/1966 | Jubilie et al. | 525/207 |
| 3,733,292 | 5/1973 | Sirota et al. | 260/29.6 |
| 4,185,051 | 1/1980 | McKenna et al. | |
| 4,452,948 | 6/1984 | Marrion et al. | 525/223 |
| 4,554,324 | 11/1985 | Husman et al. | 525/301 |
| 5,057,555 | 10/1991 | White | 525/207 |
| 5,164,441 | 11/1992 | Yang | 525/223 |
| 5,237,024 | 8/1993 | Alberry et al. | |
| 5,367,027 | 11/1994 | Fushimi et al. | 525/207 |
| 5,446,099 | 8/1995 | Yoshida et al. | 525/207 |
| 5,512,612 | 4/1996 | Brown et al. | 525/223 |

FOREIGN PATENT DOCUMENTS

| | | | |
|---|---|---|---|
| 48128 | 3/1982 | European Pat. Off. | 525/207 |

*Primary Examiner*—Carman J. Seccuro, Jr.
*Attorney, Agent, or Firm*—Michael J. Murphy

[57] ABSTRACT

A pressure-sensitive coating composition of an organic solvent solution of i) an acrylic copolymer containing carboxyl or hydroxyl groups; and ii) 0.1 to 15% by weight, based on the weight of i), of styrene-maleic copolymer.

5 Claims, No Drawings

PRESSURE-SENSITIVE ADHESIVE COMPOSITION CONTAINING STYRENE-MALEIC COPOLYMERS

BACKGROUND OF THE INVENTION

This invention relates to pressure-sensitive adhesives and more particularly to additives to enhance their performance.

Normally tacky, pressure sensitive adhesives (PSAs) are used in manufacturing articles such as adhesive tapes and other materials intended to be easily attached to a substrate by applying pressure alone. The adhesives are in the form of coatings of pressure-sensitive resins, typically acrylic copolymers, which are formed by casting them from organic solvent solutions and evaporating the solvent. PSAs usually have a balance of performance properties such as adhesion, cohesion, elongation, elasticity, etc. Maintaining the balance of such properties while improving one or more others is difficult and unpredictable. Improving one property may deleteriously affect one or more other desirable properties. For instance, high temperature resistance is a typical demand imposed on PSAs normally intended for use at ambient conditions. Also, for special applications, a PSA may be required to bond to a plasticized vinyl substrate and remain firmly bonded after contact over an extended period.

A continuing need exists to improve heat and plasticizer resistance of PSAs without adversely affecting other properties.

SUMMARY OF THE INVENTION

Now, improvements have been made increasing heat and plasticizer resistance of conventional acrylic PSA compositions.

Accordingly, a principal object of this invention is to preserve the adhesive properties of acrylic PSAs while improving their high temperature and plasticizer resistance.

Another object is to impart heat and plasticizer resistance to solution-polymerized acrylic PSAs.

Other objects of this invention will in part be obvious and will in part appear from the following description and claims.

I have found that adding styrene-maleic copolymers to already-formed acrylic polymer PSA solutions increases heat and plasticizer resistance of the PSA without sacrificing other desirable adhesive properties.

Accordingly, this invention provides a pressure-sensitive coating composition of an organic solvent solution of: i) an acrylic copolymer containing carboxyl or hydroxyl groups; and ii) 0.1 to 15% by weight, based on the weight of i) of styrene-maleic copolymer. The maleic monomer is preferably the half ester of maleic anhydride. The acrylic copolymer is formed of alkyl acrylate monomers containing 1 to 8 carbon atoms in the alkyl group and one or more monomers containing hydroxyl or carboxyl groups. After deposition on a substrate and removal of the solvent, the resulting PSA coating has the improved properties.

DETAILED DESCRIPTION OF THE INVENTION

The pressure sensitive coating compositions of the invention comprise an organic solvent solution of an acrylic copolymer and a styrene-maleic copolymer.

Acrylic copolymers are pressure sensitive resins commercially available in organic solvent solution from many sources including Monsanto Company as Gelva® Multipolymer Solutions (GMS). These acrylic copolymers comprise two or more copolymerized monomers wherein at least one is selected from each of groups a and b described below. Monomers of group c are optional in the acrylic copolymer.

Group a monomers contain one or more carboxyl or hydroxyl groups. Those containing hydroxyl groups are exemplified by hydroxyalkyl acrylates, hydroxyalkyl methacrylates, hydroxyalkyl fumarates and hydroxyalkyl maleates wherein the alkyl group contains two to four carbon atoms. Preferred hydroxyl monomers include 2-hydroxyethyl acrylate and methacrylate, 2-hydroxypropyl acrylate and methacrylate and 3-hydroxypropyl acrylate and methacrylate, bis(2-hydroxyethyl)fumarate and bis(2-hydroxyethyl)maleate. Those containing or generating carboxyl groups are exemplied by acrylic acid, methacrylic acid, crotonic acid, isocrotonic acid, and the like, maleic anhydride, maleic acid, fumaric acid, citraconic acid, iraconic acid, and the like, and alkyl monoesters of maleic acid, fumaric acid, citraconic acid and itaconic acid in which the alkyl group contains from one to eight carbon atoms such as methyl, ethyl, propyl, butyl and octyl maleates and the like, which are optionally generated in situ by reacting the appropriate alcohol with maleic anhydride units. Preferred acid monomers are acrylic acid and methacrylic acid. The amount of group a monomer in the acrylic copolymer is generally about 0.5 to about 20, preferably about 1 to about 10 weight percent of the copolymer.

Group b monomers include acrylic esters containing 1 to 8 carbon atoms in the alkyl group. Preferred group b acrylic esters are methyl acrylate, ethyl acrylate, butyl acrylate and 2-ethylhexyl acrylate.

Group c monomers include $\alpha$-olefins containing 2 to 10 carbon atoms, vinyl esters of alkanoic acid containing 1 to 10 carbon atoms such as vinyl acetate and vinyl octoate, methylacrylate and methacrylates containing 3 to 20 carbon atoms, acrylonitrile, methacrylonitrile, styrene, $\alpha$-methyl styrene, vinyl chloride and diesters of unsaturated dicarboxylic acids such as maleic, fumaric, citraconic and iraconic acid containing from 6 to 20 carbons atoms. Preferred group c monomers are vinyl acetate, methylacrylate and methacrylates containing 1 to 10 carbon atoms.

The ratio of monomers in the acrylic copolymer is selected to provide an amorphous, normally tacky pressure sensitive resin. Generally at least about 40 weight % of the acrylic copolymer consists of group b monomers.

Optionally includable in the organic solvent acrylic resin solution and resulting PSA coating is a crosslinking agent to crosslink the acrylic copolymer during solvent removal. Metal (e.g. titanium or aluminum) chelate is a suitable crosslinker. Disclosed for this purpose by formula in col. 2 of U.S. Pat. No. 3,886,126 is titanium chelate ester of orthotitanic acid.

Weight average molecular weight of the acrylic copolymer is generally about 10,000 to about 700,000 Daltons, corresponding to a relative viscosity of 1.3 to 8.0 measured on a solution of 2 grams of copolymer per deciliter of ethyl acetate. Preferred molecular weight is about 200,000 to about 700,000, providing adequate cohesive strength to the copolymer without excessive solution viscosity.

Acrylic copolymers are prepared by solution polymerization in organic solvent in some cases involving delayed addition of monomer when there is a great disparity between reactivity ratios as for example between the reactivity ratios of vinyl acetate and acrylate monomers. The time interval for the delayed addition may range from about 60 to about 600 minutes and longer. The techniques in general involve polymerization of the monomer mixtures in suitable organic solvents with the polymerization initiated by heat activated free radical initiators. Choice of solvents is governed by solubility requirements of the monomers and the resulting acrylic copolymer as well as the styrene-maleic copolymer additive further described below. Addition of further solvent to the as-polymerized acrylic copolymer solution may be advisable to reduce viscosity to facilitate handling. The monomers of the acrylic copolymer and the resulting acrylic and styrene-maleic copolymers should be soluble in the selected solvent or mixtures of solvents.

Initiators for polymerizing acrylic copolymers include organic peroxides, such as tert-butyl hydroperoxide, di-tert-butylperoxide, cumene hydroperoxide, di-cumyl peroxide, benzoyl peroxide and the like. Also organic peroxygen compounds such as tert-butyl peracetate, acetate, tert-butyl perbenzoate, di-tert-butyl perphthalate and azo compounds such as a,a'-azo-di-isobutyronitrile. Choice of initiator depends on temperature of polymerization and is readily selected by the practitioner skilled in the art.

Component (ii) of the pressure-sensitive coating composition is styrene-maleic copolymer of polymerized styrene (S) and maleic monomer, by which is meant maleic anhydride, maleic esters and maleic partial esters. These copolymers are commercially available (in powder form) from Monsanto Company as Scripset® Resins, 500 Series. They are classified into the esterified type wherein the copolymerized maleic monomer is maleic ester, primarily maleic half ester and the non-esterified type wherein the copolymerized maleic monomer is maleic anhydride.

The esterified type of S-maleic copolymer is prepared by including alcohol in the polymerization reaction with styrene or by first forming the ester or half ester from maleic anhydride and then copolymerizing with styrene or by esterifying the non-esterified styrene-maleic anhydride copolymer.

Esterifying alcohols include primary or secondary $C_1$–$C_{18}$ alcohols including mixtures of such alcohols. Usable primary alcohols include methanol, ethanol, n-propanol, n-butanol, isobutanol, n-pentanol, n-hexanol, 2-butoxyethanol, n-heptanol, n-octanol, n-decanol and higher alcohols up to n-octadecanol. Usable secondary alcohols include isopropanol, secondary butanol etc.

The monomeric ratios of S to maleic monomer in these copolymers ranges from a molar ratio of S to maleic of 1:1 for the non esterified type to 1:<1 for the esterified type.

Styrene-maleic copolymers are prepared by any conventional free radical polymerization process. Molecular weight (weight average) varies widely from about 5,000 to about 1,000,000 Daltons and is preferably about 50,000 to 450,000, most preferably about 65,000 Daltons. Preferably the styrene-maleic copolymers are prepared by in situ esterification of maleic anhydride with a mixture of methyl and isobutyl alcohol forming a mixture of the methyl and isobutyl half esters followed by bulk polymerization of the mixture with styrene at 70° to 150° C. using peroxide or hydroperoxide initiators or mixtures thereof.

Preferred styrene-maleic copolymer is the esterified type where the maleic monomer is maleic half ester—i.e. copolymer of styrene-maleic half ester where the half ester is most preferably prepared using a mixture of methanol and isobutanol—i.e. the copolymer is polymerized styrene, monomethyl maleate and mono-isobutyl maleate.

Examples of suitable solvents for acrylic copolymers and styrene-maleic copolymers include aromatic solvents such as benzene, toluene, xylene, etc. Suitable aliphatic solvents include alcohols such as methanol, ethanol, isopropanol, butanol; esters such as ethyl acetate, propyl acetate, isopropyl acetate, butyl acetate, etc.; ketones such as methyl ethyl ketone, acetone, etc. aliphatic hydrocarbons such as hexane, heptane, etc. Especially useful are mixtures of the foregoing. When the acrylic copolymer contains a major amount (more than 50 weight %) of 2-ethylhexyl acrylate, alcohol (about 10 weight %) is preferably present to facilitate dissolution of the styrene-maleic copolymer. The solvent composition is adjusted until both components (i) and (ii) are soluble with optimum property enhancement occurring when the resulting solution is clear.

In formulating pressure sensitive coating composition of the invention, the solvent-soluble styrene-maleic copolymer is added to the organic solvent solution of acrylic copolymer in an amount effective to favorably influence high temperature and/or plasticizer resistance of the resulting PSA. Small amounts avoid adversely affecting other adhesion-related properties while large amounts fail to particularly provide added benefits. In practice, 0.1 to 15% by weight styrene-maleic copolymer (based on the weight of acrylic copolymer) is preferred, most preferably 0.5 to 10% by weight when using styrene-maleic half ester copolymer.

Test procedures used in evaluating pressure sensitive adhesive coating performance are as follows:

Dynamic Shear ASTM D-3163-73—measures the ability of a 5 mils (0.13 mm) thick PSA to bear a load at elevated temperature. Condition the sample for 6 min. @108° C. and hold at that temperature while imposing the load using an Instron tester. Units are in pounds per lineal inch or kN/m.

Foam Performance Test—measures the plasticizer resistance of the adhesive under high temperature aging.
Sample preparation:

2.5 mil. (0.06 mm) dry coat weight adhesive sample is prepared on silicone release liner. Sheets of 1/32 inch (0.08 cm) thick high density polyurethane foam and 0.05 mm polyester backing sheet are precut and aged 22° C. and 50% relative humidity (constant temperature and humidity, CTH) for 24 hours. The foam is then coated with an adhesion promoter (Norton Tite-R-Bond No. 2287A) using a #6 Meyer rod. Dry at 20° C. for 5 minutes, 70° C. for 5 minutes, 121° C. for 5 minutes, then equilibrate for one hour at CTH. The adhesive is laminated to the foam side treated with adhesion promoter, and the backing laminated to the opposite side of the foam. A 1.3×10 cm plasticized PVC test bar (The Standard Products Co. part #EX-3786 -H) is cleaned with isopropanol/water 50/50 and primed with the adhesion promoter by wiping with a lint-free tissue saturated with the same adhesion promoter. The PVC bar is air dried for 5 min. The sample is cut into 1.3 cm by 15 cm strips and the release liner removed. The foam strip is placed on the PVC test bar and adhered by rolling a 10 pound rubber roller twice over the strip. The sample is allowed to equilibrate at CTH conditions for 1 hour.
Testing:

initial peel—The sample is pulled at 180° from the PVC bar at 12 inches per minute. The peel strength is measured in pounds per linear inch (pli).

1 week aged peel—The samples are conditioned for 24 hours then placed in an oven at 88° C. for 1 week. After removal from the oven the samples are equilibrated for 1 hour then tested the same as for initial peel.

2 week aged peel—The samples are conditioned for 24 hours then placed in an oven at 88° C. for 2 weeks. After removal from the oven the samples are equilibrated for 1 hour and tested the same as for initial peel.

In results of this test presented below the following terms have the noted meanings:

A—adhesive failure
F—foam failure
T—transfer of adhesive from foam to test bar

The invention is further described in the following Examples which are for illustration only and not to limit or restrict the invention. Percentages are by weight.

EXAMPLES 1–39

Use Monsanto GMS compositions and Scripset products to prepare pressure sensitive coating compositions of organic solvent solutions of acrylic resin and styrene-maleic copolymer. Constituents of and their amounts in these polymers are shown below. In preparing the solutions, styrene maleic copolymer in powder form is first dissolved in solvent and that solution is intimately mixed into the more viscous acrylic polymer solution. The adhesive solution is coated on a silicone release liner. Thickness (dry basis) varies from 2.5 to 5 mils (0.06 to 0.13 mm). The coated release liner is placed in an oven for 5 min. to evaporate the solvent. Test specimens are prepared and the tests noted above performed. Pressure sensitive adhesive coating performance results are in Table 2; the compositions are identified in Table 1 (Exs. 1–7) for which results are provided in Table 2 (Exs. 8–39).

TABLE 1

| Example | 1 | 2 | 3 | 4 | 5 | 6 | 7 |
|---|---|---|---|---|---|---|---|
| Acrylic Resin Composition | | | | | | | |
| ethyl acrylate | 0% | 0% | 0% | 0% | 96% | 0% | 96% |
| 2-ethylhexyl acrylate | 61% | 61% | 61% | 61% | 0% | 0% | 0% |
| butyl acrylate | 0% | 0% | 0% | 0% | 0% | 48% | 0% |
| methyl acrylate | 33% | 33% | 33% | 33% | 0% | 48% | 0% |
| acrylic acid | 6% | 6% | 6% | 6% | 4% | 4% | 0% |
| hydroxyethyl acrylate | 0% | 0% | 0% | 0% | 0% | 0% | 4% |
| Mw | 675,000 | 675,000 | 675,000 | 620,000 | 390,000 | 360,000 | 300,000 |
| Resin Solids | 35% | 31% | 35% | 32% | 42% | 42% | 45% |
| Solvent | | | | | | | |
| ethyl acetate | 39% | 37% | 39% | 39% | 45% | 51% | 47% |
| hexane | 8% | 8% | 9% | 8% | 0% | 0% | 0% |
| isopropanol | 7% | 7% | 0% | 1% | 13% | 0% | 8% |
| ethanol | 0% | 3% | 1% | 4% | 0% | 7% | 0% |
| toluene | 0% | 12% | 0% | 0% | 0% | 0% | 0% |
| MEK | 0% | 2% | 0% | 0% | 0% | 0% | 0% |
| xylene | 4% | 0% | 0% | 0% | 0% | 0% | 0% |
| butanol | 7% | 0% | 0% | 0% | 0% | 0% | 0% |

| | | Styrene-Maleic (SMA) Copolymer | | | | | |
|---|---|---|---|---|---|---|---|
| | | maleic | maleic half esters | | | | |
| Type | styrene | anhydride | methyl | isobutyl | s-butyl | butylcellosolve | Mw |
| A | 50% | 39% | 11% | 0% | 0% | 0% | 450,000 |
| B | 48% | 2% | 11% | 0% | 39% | 0% | 120,000 |
| C | 46% | 0% | 0% | 54% | 0% | 0% | 65,000 |
| D | 45% | 4% | 11% | 40% | 0% | 0% | 180,000 |
| E | 39% | 0% | 0% | 27% | 0% | 34% | 220,000 |

TABLE 2

| Example | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|
| Acrylic Resin Comp. (Ex.) | 1 | 1 | 1 | 1 | 3 | 4 | 4 | 2 | 2 | 4 | 4 | 5 | 5 | 5 | 5 | 5 |
| Crosslinker (on acrylic resin) | | | | | | | | | | | | | | | | |
| titanium chelate | 0.4% | 0.4% | 0.4% | 0.4% | 0.4% | 0.5% | 0.5% | 0.4% | 0.4% | 0.0% | 0.0% | 0.0% | 0.0% | 0.0% | 0.0% | 0.0% |
| aluminum chelate | 0.0% | 0.0% | 0.0% | 0.0% | 0.0% | 0.0% | 0.0% | 0.0% | 0.0% | 0.0% | 0.0% | 0.4% | 0.4% | 0.4% | 0.4% | 0.4% |
| SMA Copolymer | | | | | | | | | | | | | | | | |
| Type | none | C | C | C | C | none | C | none | C | none | C | none | B | D | D | D |
| Amount (on acrylic resin) | 0% | 1% | 3% | 5% | 1% | 0% | 1% | 0% | 2% | 0% | 2% | 0% | 5% | 2% | 10% | 20% |
| Dynamic shear ASTM D-3163-73 | 6.05 | 10.4 | 12.4 | 13.3 | 14.8 | 7.5 | 0.1 | 7.8 | 9.1 | 7.4 | 10.5 | 7.8 | 9.1 | | | |
| Foam peel test from PVC bar | | | | | | | | | | | | | | | | |
| Initial | | | | | | | | | | | | | 5.8 | 4 | 5.8 | 3 | 1.6 |
| Failure mode | | | | | | | | | | | | | T | T | T | A | A |
| Aged one week | | | | | | | | | | | | | 4.3 | 12 | 4.8 | 12 | 12 |
| Failure mode | | | | | | | | | | | | | T | F | T | F | F |
| Aged two weeks | | | | | | | | | | | | | 2.9 | 12 | 3.6 | 12 | 12 |

TABLE 2-continued

| Failure mode | | | | | | | | | | | | T | F | T | F | F |
|---|---|---|---|---|---|---|---|---|---|---|---|---|---|---|---|---|
| Example | 24 | 25 | 26 | 27 | 28 | 29 | 30 | 31 | 32 | 33 | 34 | 35 | 36 | 37 | 38 | 39 |
| Acrylic Resin Comp. (Ex.) | 5 | 5 | 5 | 5 | 5 | 5 | 5 | 5 | 5 | 6 | 6 | 6 | 6 | 7 | 7 | 7 |
| Crosslinker (on acrylic resin) | | | | | | | | | | | | | | | | |
| titanium chelate | 0.0% | 0.0% | 0.0% | 0.0% | 0.0% | 0.0% | 0.0% | 0.0% | 0.0% | 0.0% | 0.0% | 0.0% | 0.0% | 0.0% | 0.0% | 0.0% |
| aluminum chelate | 0.4% | 0.4% | 0.0% | 0.0% | 0.0% | 0.0% | 0.4% | 0.0% | 0.4% | 0.4% | 0.4% | 0.4% | 0.4% | 0.4% | 0.4% | 0.4% |
| SMA Copolymer | | | | | | | | | | | | | | | | |
| Type | A | A | B | none | E | E | E | B | B | none | C | C | C | | C | C |
| Amount (on acrylic resin) | 2% | 10% | 5% | 0% | 1.5% | 5% | 1.5% | 5.0% | 5.0% | 0% | 1% | 5% | 10% | 0% | 2% | 5% |
| Dynamic shear ASTM D-3163-73 | | | | | | | | | | | | | | | | |
| Foam peel test from PVC bar | | | | | | | | | | | | | | | | |
| Initial | 5.2 | 2.8 | 6 | 5.8 | 5.7 | 4.8 | 4.2 | 5.0 | 4 | 12 | 12 | 4.85 | 2.6 | 4.2 | 4.7 | 4.2 |
| Failure mode | A | A | A/T | A | T | T | T | T | T | F | F | A | A | A | A | A |
| Aged one week | 4.1 | 12 | 12 | 4.2 | 12 | 12 | 4.4 | 12 | 12 | 3.7 | 12 | 12 | 12 | 4.3 | 12 | 12 |
| Failure mode | T | F | F | A | F | F | T | F | F | A | F | F | F | A | F | F |
| Aged two weeks | 3.5 | 12 | 12 | 3 | 4.6 | 12 | 2.6 | 12 | 12 | 3.15 | 9.35 | 12 | 12 | 7.8 | 12 | 12 |
| Failure mode | T | F | F | A | T | F | T | F | F | A | A | F | F | A | F | F |

The above shows the unexpected significant improvement in the elevated temperature dynamic shear property of the PSA as compared with the controls. For example, in Ex. 11 more than a twofold increase in such property occurred when 5% styrene-maleic copolymer was included in the formulation (versus Ex. 8). With respect to improving plasticizer and elevated temperature resistance without loss of other adhesive properties, note, for example, Examples 27 and 28. Without the SMA additive (Ex. 27) initial peel is 5.8 pounds and one week peel is 4.2 pounds whereas with 1½% SMA (Ex. 28) initial peel at 5.7 pounds is about the same but one week aged peel significantly increases to 12 pounds. Similar results appear in Examples 33 and 34.

The preceding description is for illustration only and not to be taken in a limited sense. Various modifications and alterations will be suggested to persons skilled in the art. The foregoing, therefore, is exemplary only and the scope of the invention is to be ascertained from the following claims.

I claim:

1. A pressure-sensitive coating composition comprising an organic solvent solution of:
   i) an acrylic copolymer containing an acrylic ester and a comonomer having carboxyl or hydroxyl groups; and
   ii) 0.1 to 15% by weight, based on the weight of i) of styrene-maleic copolymer selected from the group consisting of styrene-maleic anhydride copolymer, styrene-maleic ester copolymer and styrene-maleic partial ester copolymer.

2. The composition of claim 1 wherein the acrylic copolymer includes 0.5 to 20% of one or more monomers containing hydroxyl or carboxyl groups and 99.5 to 80% of one or more copolymerized alkyl acrylate monomers having 1 to 8 carbon atoms in the alkyl group.

3. The composition of claim 2 wherein the styrene-maleic copolymer is present at about 0.5 to 10% and is styrene-maleic half ester having a molecular weight between about 5,000 and about 1,000,000 Daltons.

4. A plasticizer and heat resistant pressure-sensitive adhesive coating comprising:
   i) a copolymer of alkyl acrylate having 1 to 8 carbon atoms in the alkyl group and acrylic acid; and
   ii) 0.1 to 15% by weight, based on the weight of i) of styrene-maleic copolymer selected from the group consisting of styrene-maleic anhydride copolymer, styrene-maleic ester copolymer and styrene-maleic partial ester copolymer.

5. The coating of claim 4 wherein the styrene-maleic copolymer is present at about 0.5 to 10% and is styrene-maleic half ester having a weight average molecular weight of about 50,000 to 450,000 Daltons.

* * * * *